US009665943B2

(12) United States Patent
Baruch et al.

(10) Patent No.: US 9,665,943 B2
(45) Date of Patent: May 30, 2017

(54) HISTOGRAM-BASED IMAGE SEGMENTATION

(71) Applicant: INTEL CORPORATION, Santa Clara, CA (US)

(72) Inventors: Gilad Baruch, Jerusalem (IL); Doron Dag, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/866,686

(22) Filed: Sep. 25, 2015

(65) Prior Publication Data

US 2017/0091947 A1    Mar. 30, 2017

(51) Int. Cl.
*G06K 9/34* (2006.01)
*G06T 7/00* (2017.01)
*G06T 5/40* (2006.01)

(52) U.S. Cl.
CPC .............. *G06T 7/0081* (2013.01); *G06T 5/40* (2013.01); *G06T 2207/10024* (2013.01)

(58) Field of Classification Search
CPC .................. H04N 5/23254; G06T 2207/20021
See application file for complete search history.

(56) References Cited

U.S. PATENT DOCUMENTS

| 6,731,792 B1* | 5/2004 | Tanaka ..................... G06K 9/38 382/164 |
| 2010/0080459 A1 | 4/2010 | Dai et al. |
| 2013/0170750 A1 | 7/2013 | Thakkar |
| 2014/0270499 A1 | 9/2014 | Kono et al. |
| 2015/0213582 A1 | 7/2015 | Kim |

OTHER PUBLICATIONS

Comaniciu et al.; "Mean shift: a robust approach toward feature space analysis"; IEEE transactions on pattern analysis and machine intelligence, vol. 24, issie 5; May 2002; pp. 1-37.*
Ning et al.; "Robust mean shift tracking with corrected background-weighted histogram"; IET computer vision, vol. 6, issue 1; Jan. 2012; pp. 1-27.*
Eric Johnson, "Mean Shift Segmentation", Advanced Team Project (ATP) 2010, <http://www.cs.stolaf.edu/wiki/images/f/fb1080390_bg_paper.pdf>, 6 pages, St. Olaf College, (published before this application Sep. 2015).
Wikipedia, "Image Histogram", Wikipedia: The Free Encyclopedia, Aug. 31, 2015, 2 pages.
International Search Report and Written Opinion for International Patent Application No. PCT/US2016/048519, mailed Dec. 5, 2016, 14 pages.
D. Daniel Ratna Raju et al., "Image Segmentation by using histogram thresholding", International Journal of Computer Science Engineering and Technology, Jan. 2012, vol. 2, Issue 1, p. 776-779.

* cited by examiner

*Primary Examiner* — Eueng-Nan Yeh
(74) *Attorney, Agent, or Firm* — Jordan IP Law, LLC

(57) ABSTRACT

Systems, apparatuses, and/or methods may provide for segmenting an image by generating a histogram of its pixel values, dividing the histogram into class intervals, and then iteratively computing new, shifted weighted means and shifted class interval boundaries for the class intervals until a predetermined level of convergence to a limit is obtained. The pixels may then be updated to a last weighted mean for class intervals to which they belong, providing segmentation. Similarly, any data may be segmented to provide computational efficiency.

25 Claims, 17 Drawing Sheets

Segments

FIG. 14A  Graphics Processor Command Format 900
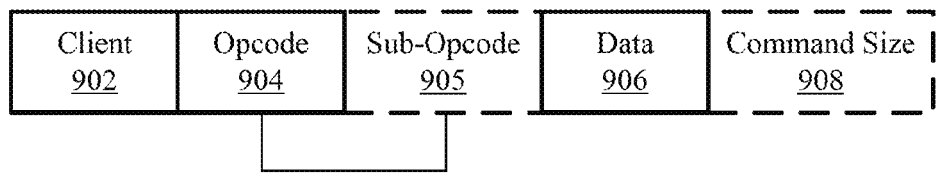
FIG. 14B  Graphics Processor Command Sequence 910
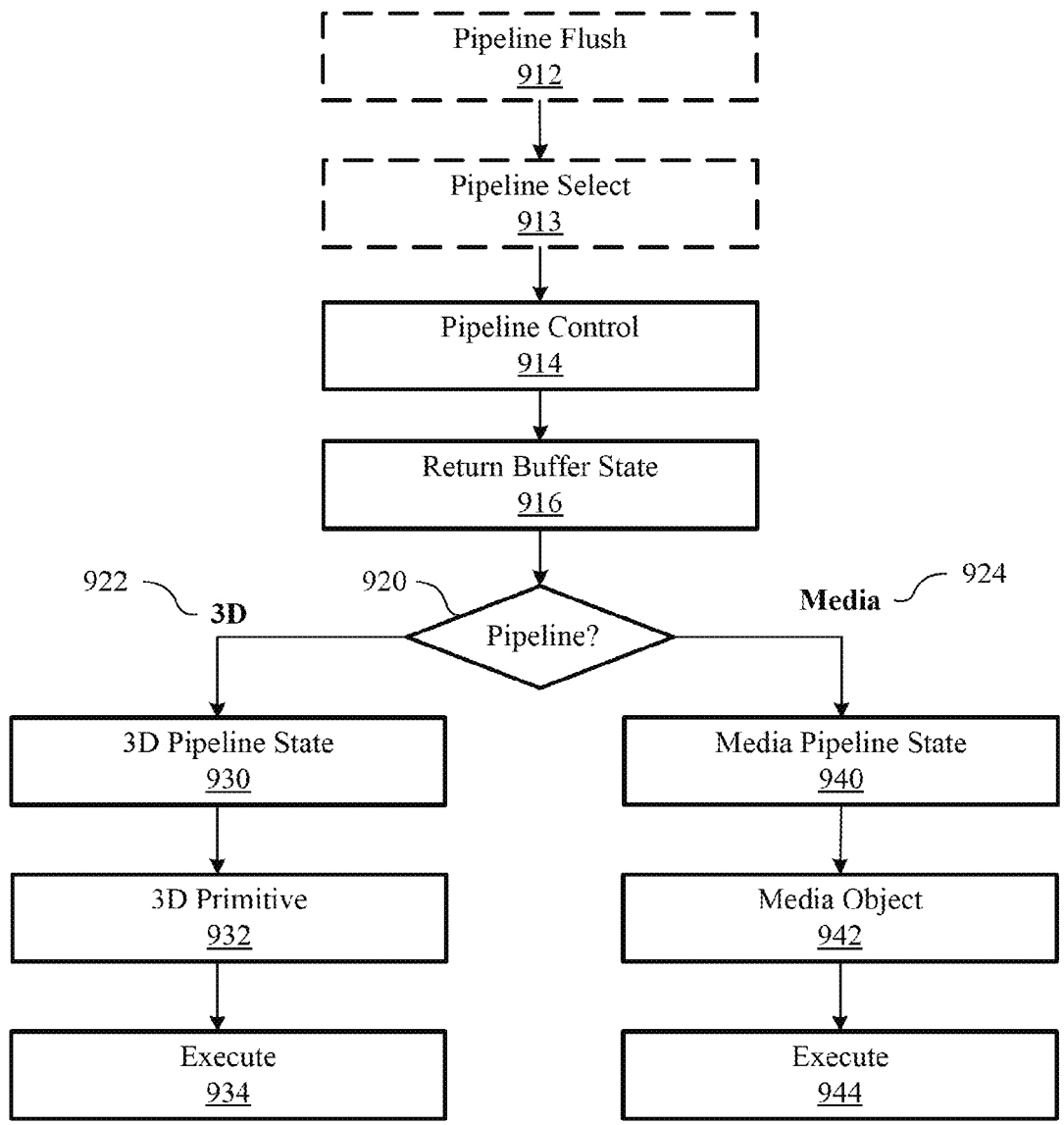

HISTOGRAM-BASED IMAGE SEGMENTATION

BACKGROUND

Applications may utilize image analysis, which may be computationally demanding on hardware resources. Image analysis segmentation, which may involve subdividing an image into constituent regions or objects, may be an approach to reduce the demands placed on the hardware resources. Thus, image segmentation may be used in a variety of applications that utilize image analysis such as, for example, computer vision applications, object tracking, object identification, etc.

Moreover, segmentation may be useful in an analysis and/or a manipulation of data sets, including image data. In one example when an image is divided into foreground and background, segmentation may be useful to prevent a portion of an object from being classified as belonging to the background while another portion of the same object is classified as belonging to the foreground. Segmentation, however, may be computationally demanding. Thus, performance of an application and suitability of available hardware to run the application may be impacted by an increase in speed and/or efficiency of segmentation performed for image data, other forms of data, etc.

BRIEF DESCRIPTION OF THE DRAWINGS

The various advantages of the embodiments will become apparent to one skilled in the art by reading the following specification and appended claims, and by referencing the following drawings, in which:

FIGS. 14A-14B are block diagrams of examples of graphics pipeline programming according to an embodiment;

DETAILED DESCRIPTION

Figure 1:
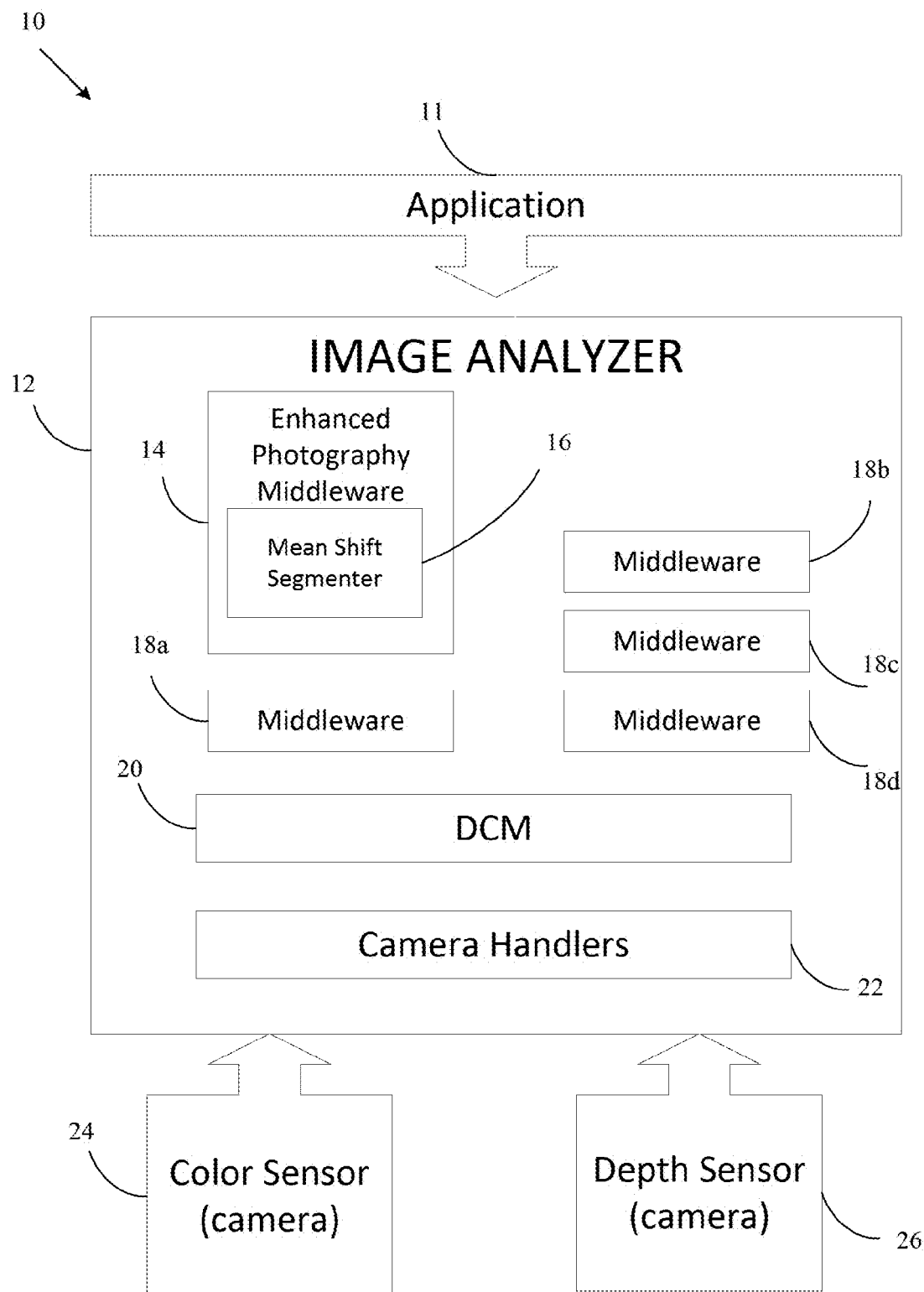
FIG. 1 is a block diagram of an example of an image analysis system that includes a histogram-based mean shift segmenter according to an embodiment.

FIG. 1 shows a block diagram of an embodiment of a system 10 to analyze an image using image segmentation. In the illustrated example, the system 10 includes an application 11 that may be, for example, an application that employs object recognition, an application that performs object tracking in motion video, and so forth. The application 11 may invoke an image analyzer 12, which may provide image segmentation to facilitate tasks required by the application 11. In the illustrated example, the image analyzer 12 includes enhanced photography middleware 14 having a mean shift segmenter 16, discussed in detail below.

The image analyzer 12 further includes various forms of middleware 18a-18d that may implement image analysis tasks such as, for example, hand gesture recognition, facial detection, object ranging, and/or other tasks to facilitate an analysis of an image and/or that may be useful to the application 11. The image analyzer 12 may further include a depth camera manager (DCM) 20 to manage streams of image data from camera handlers 22 provided by a color sensor 24 and a depth sensor 26 of one or more image capture devices (e.g., two-dimensional camera, three-dimensional camera, etc.).

Execution of the application 11 may be computationally demanding for a hardware system, wherein performance of the application 11 and/or of the hardware system may appear to a user as deficient. Accordingly, image segmentation may be performed to facilitate the execution of the application 11 and/or the operation of the hardware system. Additionally, segmentation may be useful in of itself, and/or as part of another process. For example, segmenting an object may be a first step in performing an operation on the object (e.g., in a data representation of the object, etc.). Thus, embodiments disclosed herein may efficiently segment an image or other data set, and/or may allow hardware to accomplish application tasks that may otherwise be impractical from a user's point of view.

Figure 2:
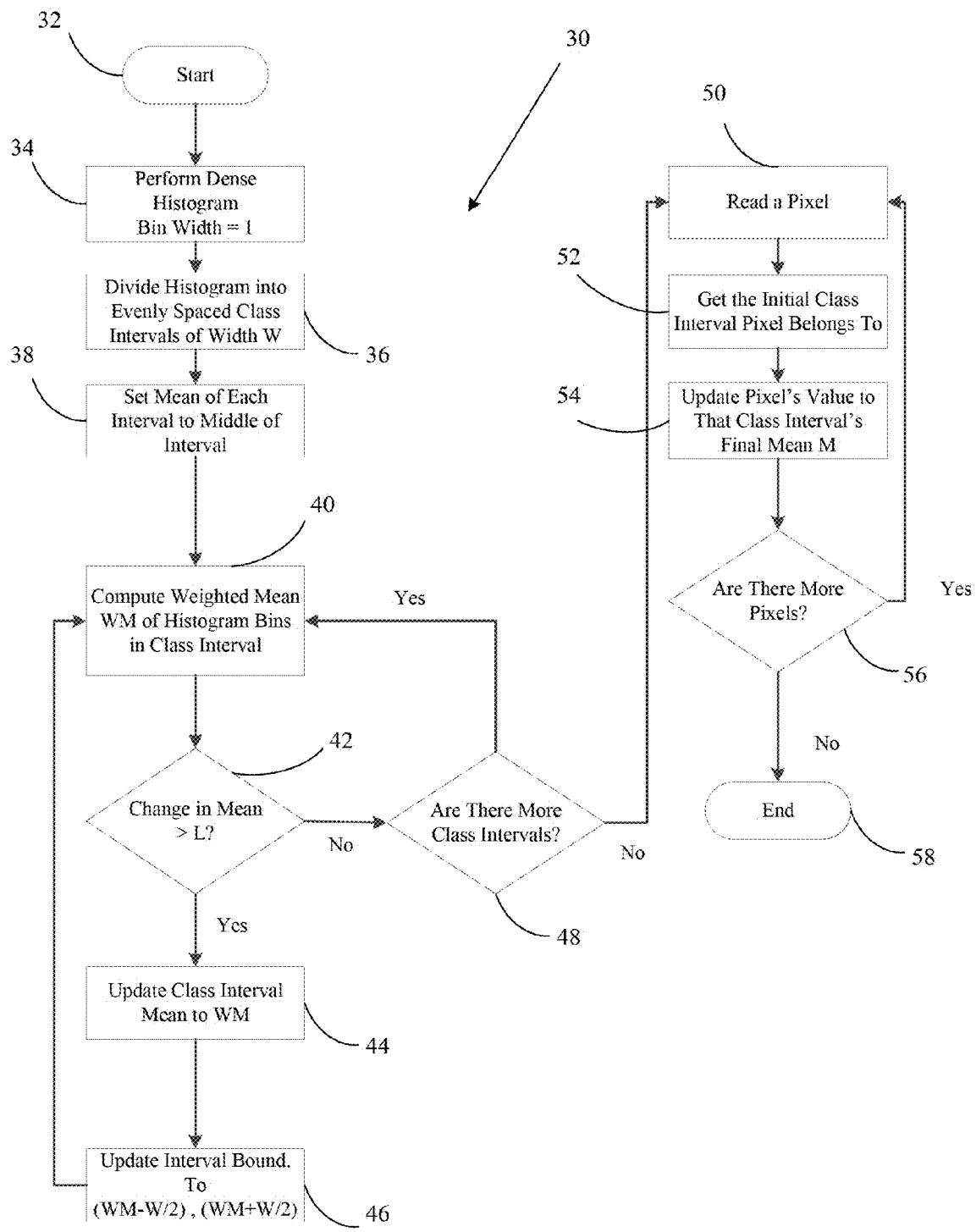
FIG. 2 is a flowchart of an example of a method of histogram-based image segmentation according to an embodiment.

FIG. 2 shows a flowchart of an example of a method 30 of segmenting an image using a histogram-based mean shift. The method 30 may be implemented in one or more modules as a set of logic instructions stored in a machine- or computer-readable storage medium such as random access memory (RAM), read only memory (ROM), programmable ROM (PROM), flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 30 may be written in any combination of one or more programming languages, including an object oriented programming language such as C++ or the like and conventional procedural programming languages, such as the "C" programming language or similar programming languages. Moreover, the method 30 may be implemented using any of the herein mentioned circuit technologies.

Figure 3A:
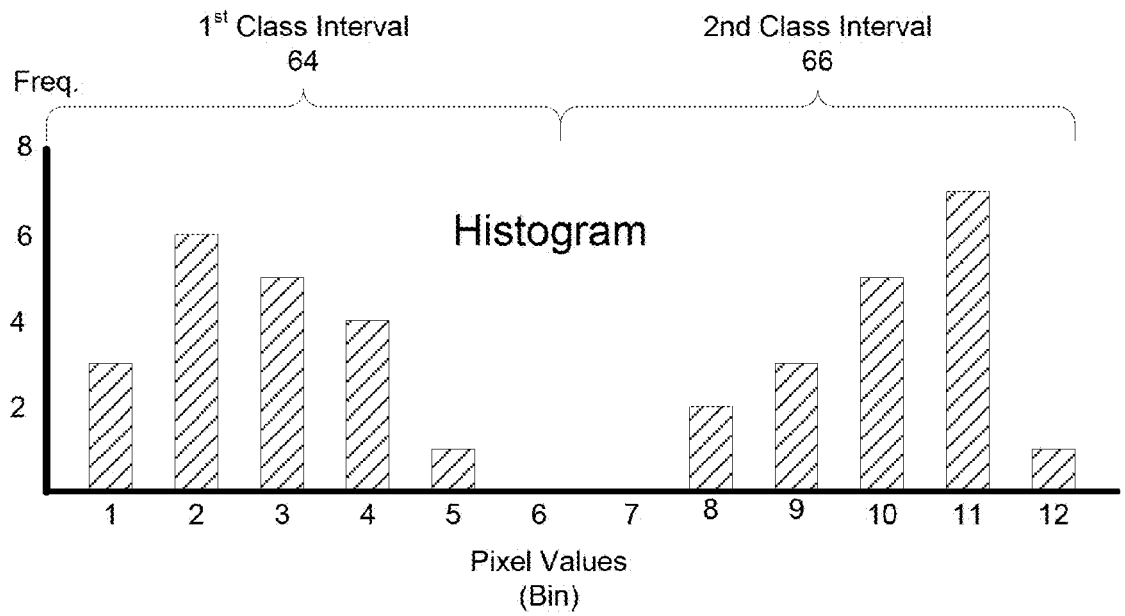
FIG. 3A is an example of a histogram of pixels in an image to be segmented according to an embodiment.
Figure 3B:
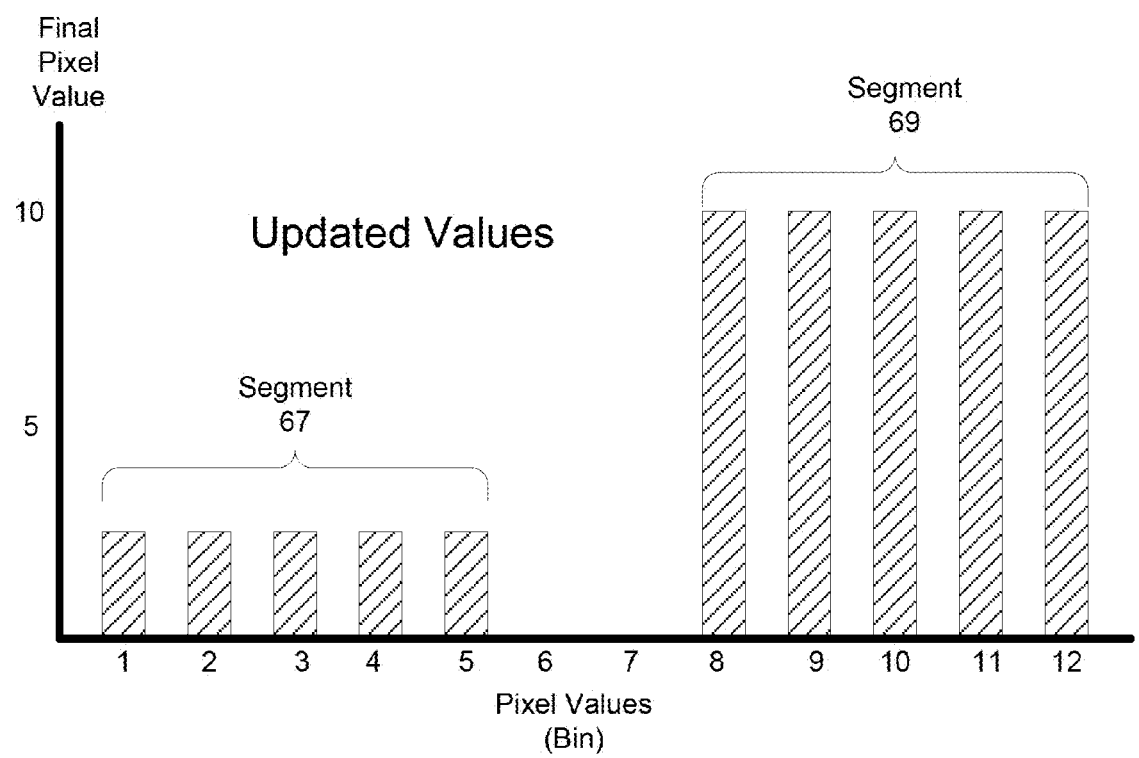
FIG. 3B is an example of a graph showing final values of the pixels in FIG. 3A after mean shift segmentation according to an embodiment.

An explanation of the method 30 is provided with reference to FIG. 2 and FIGS. 3A-3B. Referring to FIG. 2, illustrated processing block 32 begins to execute an image segmentation task, and illustrated processing block 34 generates a histogram of pixels in an image. In one example, the histogram tallies a number of pixels in the image having a given pixel value, where the pixel values may be reflective of a trait and/or a quality that may be of interest to an application. For example, the trait may correspond to brightness, intensity, color, distance or depth, disparity, and so forth. In image analysis, for example, a disparity image may depict a difference in images or data provided by two stereoscopic cameras or sensors. Generally, the term "disparity" may refer to a data set that represents the difference between two other data sets.

Referring to FIG. 3A, an example of a histogram is shown that may be generated of a relatively simple image (e.g., in terms of a number of pixels considered). In the illustrated example, the horizontal axis presents twelve possible pixel values that a pixel may have, ranging from 1 through 12, and the vertical axis presents the frequency of their occurrence in the image. Thus, for example, pixels having a pixel value of 1 occur three times, pixels having a pixel value of 2 occur 6 times, and so forth. Moreover, each pixel may have an address in the starting image, and while not illustrated, the pixel address and its value may be stored in a memory location for every pixel in the image.

In the illustrated example, the number of pixels (37) and pixel values (12) considered have been kept to a small number for purposes of illustration. In most applications, however, the histogram may be "dense," having many more pixel values along its horizontal axis and encompassing many more pixels in total. For example, a Video Graphics Array (VGA) image may have 640 rows of pixels×480 columns of pixels, or 307,200 pixels in total, and a palate that may be hundreds or more levels deep (even in monochrome). In the illustrated example, each pixel value may correspond to a bin of width 1, in which each bin contains every occurrence of pixels having a particular pixel value. In other embodiments, however, bin widths of greater than 1 may be employed. For example, a first bin may include all pixels having pixel values of 1-2, a second bin may include all pixels having pixel values of 3-4, and so forth. In some embodiments, pixel values may be scaled to fall between 0 and 1, wherein the bins may have a fractional width (e.g., 0.001, etc.).

Referring back to FIG. 2, illustrated block 36 divides the histogram into a plurality of evenly spaced class intervals of width W. The particular number of class intervals used may be driven by an application. For example, if the application calls for determining object depth (i.e., distance), dividing pixel values corresponding to depth across a range of 1-1000 cm (10 meters) into 12 class intervals may be sufficient, depending on the level of granularity called for by the application. As shown in FIG. 3A, the histogram has been divided into two class intervals. A first class interval 64 encompasses pixel values 1-6, wherein the upper value (6) and lowest value (1) may define class interval boundaries for the first class interval 64. Similarly, a second class interval 66 encompasses pixel values 7-12 and has class interval boundaries 7 and 12. While each class interval has the same width W, in some embodiments each class interval may have its own class width. In further embodiments, empty or nearly empty boundary bins may be truncated from a class interval.

Referring back to FIG. 2, illustrated block 38 defines an initial mean for each class interval. The initial mean may be a midpoint or median of the pixel values in the corresponding class interval. In some embodiments, the initial mean may be an unweighted mean of the pixel values in the class interval, or may be some other statistical measure of centrality or spread of pixel values in the class interval (e.g., a modified median, a weighted mean, etc.). As shown in FIG. 3A, the initial mean of the first class interval 64 is an unweighted arithmetic mean of the pixel values assigned to the first class interval 64:

$$\text{Initial Mean}=(1+2+3+4+5+6)/6=3.5$$

Similarly, the initial mean of the second class interval 66 is an unweighted arithmetic mean of the pixel values assigned to the second class interval 66:

$$\text{Initial Mean}=(7+8+9+10+11+12)/6=9.5$$

Referring back to FIG. 2, illustrated block 40 computes a weighted mean WM of the bins in each class interval, in effect "shifting" the mean for each class interval to a new value. In the example shown in FIG. 3A, each value along the horizontal axis of the histogram is its own bin of bin width=1. As noted above, however, in other embodiments bins may include more than one pixel value. The weighted mean WM of a given class interval may be computed as follows:

$$WM=(\Sigma_i w_i * x_i)/\Sigma_i w_i \quad \text{(Eqn. 1)}$$

wherein i indexes values in the class interval such that $x_i$ is the ith pixel value in the class interval and $w_i$ is a weighting function associated with the ith pixel value. If the bins that contain the pixel values have a width greater than 1, the ith weighting function may be associated with the ith bin rather than the individual pixel values $x_i$.

The weighting function may be the number of pixels in a bin having a pixel value $x_i$. In one example where the bins have a bin width=1, as shown in FIG. 3A, the weighting function may be the number of pixels having a given pixel value. Applying that weighting function to the data shown in FIG. 3A, a weighted mean of 2.68 for class interval 64 and a weighted mean of 10.11 for class interval 66 may be computed.

In some embodiments, the weighting function may be some other statistical measure of the spread, average, mode, distribution, number of pixel values, and so forth. In other embodiments, the weighting function may be a step function that gives a weight of 0 if, for example, the number of pixels in a bin is less than a threshold, and 1 if the number of pixels in a bin is equal to or greater than the threshold.

Referring back to FIG. 2, a determination may be made at processing block 42 whether the newly computed class mean for the class interval differs from the previously computed mean (e.g., whether itself a weighted mean or the initial mean) by more than some predetermined limit L. The choice of value for L may represent a tradeoff between accuracy and performance, with small values for L corresponding to greater accuracy and larger values for L providing faster performance, possibly at the cost of lower accuracy. In some embodiments, a small value for L may be selected in conjunction with limitations to the number of iterations permitted.

If the determination at block 42 is YES, then illustrated processing block 44 updates the most recently computed mean of the class interval to WM. Illustrated processing block 46 updates the boundaries of the class interval to the new weighted mean plus-or-minus one half the width of the class interval, as follows:

$$\text{Updated Class Boundaries}=(WM-W/2),(WM+W/2) \quad \text{(Eqn. 2)}$$

Control then passes back to block 40, wherein a new weighted mean may be computed for the class interval. The effect is to shift the mean of each class interval to a new mean based on a newly computed weighted mean, and to shift the class boundaries of the class intervals.

If a determination is made at block 42 that the newly computed class mean WM does not differ from the previously computed mean by more than L (i.e., NO), then the two most recently computed means for the class interval are judged to have converged, and a determination may be made at processing block 48 if there are additional class intervals in the histogram to consider. If so, then control passes to block 40 for computation of a weighted mean for the next class interval as before. If there are no remaining class intervals, then a next phase of the method 30 reassigns values associated with the pixels.

Illustrated processing block 50 reads a pixel and illustrated processing block 52 determines the class interval (i.e., first class interval, second class interval, etc.) that the pixel initially corresponds to. Illustrated processing block 54 updates the pixel value of the pixel to that class interval's final shifted mean value, which may be the final weighted mean computed at block 40 for that class interval. Illustrated processing block 56 determines if there are more pixels to consider, and if so, control passes back to block 50. If there are no further pixels to consider, the process ends at illustrated block 58. The updated pixel values may be used to generate a segmented image.

Using a limit of L=0.1, the method 30 converges to final weighted means of 2.61 and 10.2 for the pixel values associated with class intervals 64 and 66, respectively, shown in FIG. 3A. Thus, in this example, all pixels having initial pixel values of 1-6 are assigned final pixel values of 2.61, and all pixels having initial pixel values of 7-12 are assigned final pixel values of 10.2, as shown at segment 67 and segment 69, respectively, in FIG. 3B. (Neither segment in this example is shown as including pixels having initial pixel values of 6 or 7 since pixel values of 6 or 7 do not appear in the initial image and have been truncated from the segments.) The number of segments in this example is the same as the number of class intervals employed—2. More generally, the number of class intervals into which the histogram has been divided may correspond to the number of segments produced by the method 30.

In some embodiments, boundaries and ranges of the class intervals may be truncated, rounded to the nearest integer, or extended for convenience and/or to exclude boundary bins that are deemed not to have a sufficient amount of pixels to merit consideration. Fractional pixel values may be truncated, rounded up or down, and/or weighted differently, as may fractional class boundaries. For example, in the example depicted in FIG. 3B, the first class interval 64 may have a final computed range of 1-5.61, and the second class interval 66 may have a final computed range of 7.2-12, which may be truncated to 1-5 and 8-12 respectively as shown in FIG. 3B, or they may be extended to encompass the fractional values and have final computed ranges of 1-6 and 7-12 respectively.

Advantageously, characterizing an image via a histogram and then dividing the histogram into class intervals may allow for pixels to be aggregated together by class interval and means to be computed on a class interval basis. Computational efficiently may be increased relative to computing means about neighborhoods of each individual pixel separately. Techniques disclosed herein such as the method 30 may have an order of complexity of $O(N+k*M)$, wherein N is the number of pixels in an image, k is the average number of iteration steps to convergence, and M is the number of bins. Also, the image may be read only twice; namely, once for computing the histogram and once when updating the pixel values to generate a new, segmented image. Other operations discussed above (e.g., shifting boundaries) may be performed using histogram class intervals that may be substantially more computationally compact than alternatives.

The method 30 need not be sensitive to a spatial distance between pixels and may also be performed in cases where spatial locality is of lesser importance. One of the possible ways to implement the foregoing approach may be as follows.

Figure 4:
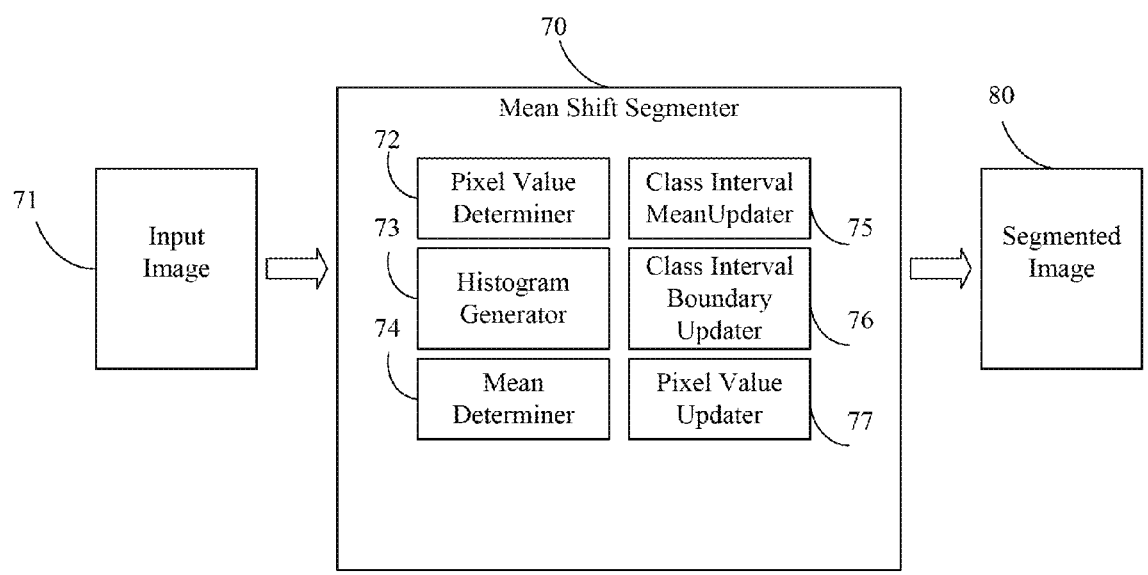
FIG. 4 is a block diagram of an example of a mean shift segmenter according to an embodiment.

FIG. 4 shows an example of an embodiment of a mean-shift segmenter 70 that may be used to segment an image. The mean-shift segmenter 70 may generally implement one or more aspects of the method 30 (FIG. 2), already discussed. In the illustrated example, an input image 71 is passed to the mean-shift segmenter 70, wherein a pixel value determiner 72 reads each pixel in the image and determines its corresponding pixel value. The pixel values are then fed to a histogram generator 73, which generates a histogram of the pixel values, divides the histogram into a number of class intervals, and defines boundaries for each class interval.

A mean determiner 74 computes initial means for each class interval, and subsequently computes weighted means for each class interval (if needed). A class interval mean updater 75 updates the mean associated with each class interval, and a class interval boundary updater 76 updates the class interval boundaries, discussed above. When final mean values for each class interval are provided, the pixels are updated to the final mean values by a pixel value updater 77. The updated pixels may then be used to generate a segmented image 80.

The elements depicted in FIG. 4 may be varied in arrangement and task. For example, the histogram generated may, in an alternative embodiment, include a class interval mean updater and a class interval boundary updater. In another example, the pixel value determiner may be part of a camera.

Figure 5A:
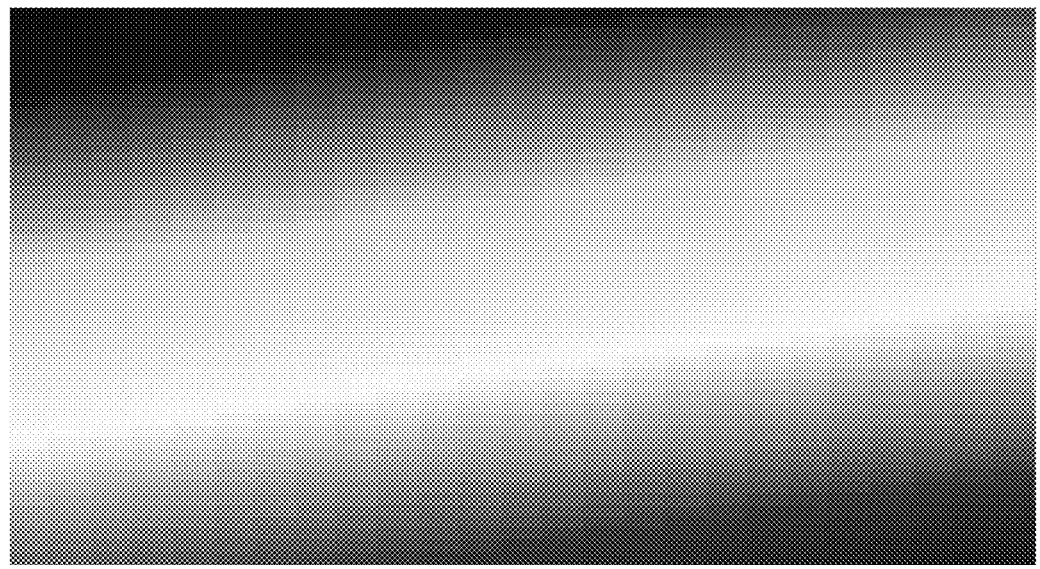
FIGS. 5A-5B are example images before mean shift segmentation and after mean shift segmentation according to an embodiment.
Figure 5B:
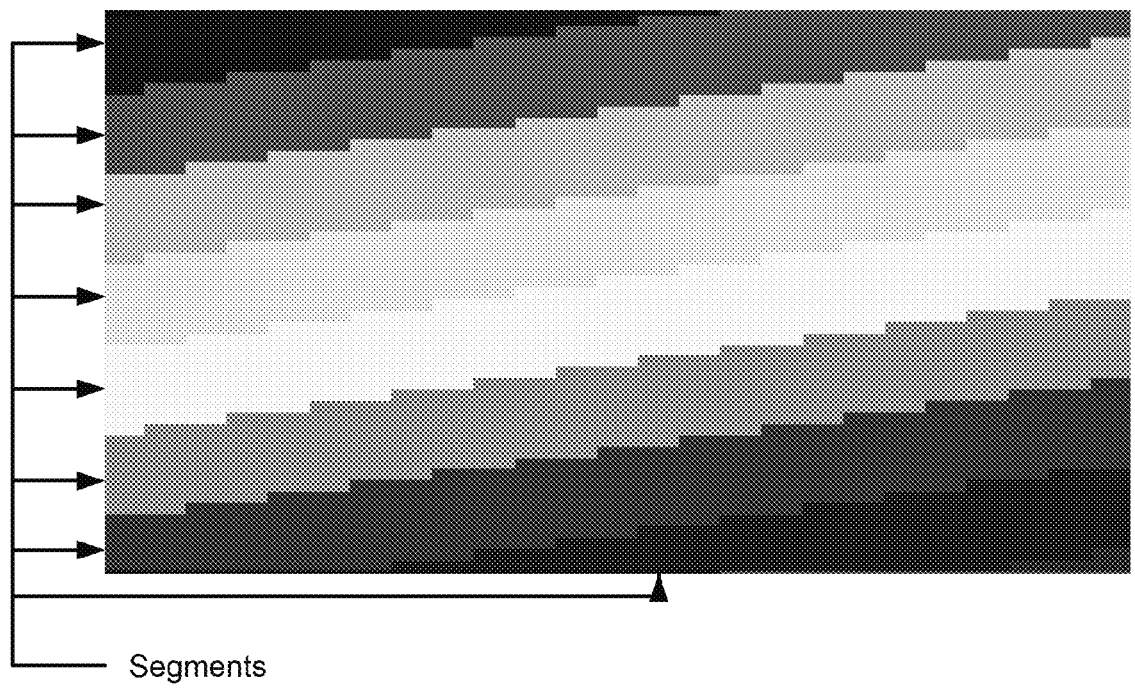

FIGS. 5A-5B illustrate an effect of segmentation on an image. The image in FIG. 5A is not segmented, and FIG. 5B shows a segmented version of the same image. There are 8 segments in the segmented image in this example, which may correspond to the division of the pixels in FIG. 5A into 8 class intervals during a segmentation process.

In some embodiments, pixels may have single dimensional values. For example, a single dimensional value associated with a pixel may be a scalar, such as depth (the distance of an object in the image from the camera capturing the image). The techniques disclosed herein may be used in other embodiments in which each pixel value is multidimensional or multispectral. For example, if the pixel value is color, then a pixel value may include intensities of red, green, and blue (RGB values, which are used in the RGB model) or other values indicative of color. Examples of other models that may be used include the HSI model (hue, saturation, intensity), the CMY model (cyan, magenta, yellow), and the CMYK model (cyan, magenta, yellow, and black). In each case, the pixel value is multispectral, i.e., multidimensional. Thus, pixel values may be represented in a suitable multidimensional space. For example, in the case of the RGB model, pixel values may map onto a color space whose dimensions are intensities of red, green, and blue.

In the case of the RGB model, the range of colors that may be represented by the pixel values may be an RGB space of voxels, and a particular pixel value may be a vector in the form of (r,g,b) extending from the origin (zero intensity) to the particular values for red, green, and blue indicated by r,g, and b coordinates in the RGB space. A histogram may be constructed by associating each voxel in this RGB space with a number indicating a number of pixels in the image having that voxel's RGB value. An individual voxel may be taken to be its own bin or, in some embodiments, each bin may represent its own group of voxels (e.g., a cube of voxels in RGB space). However defined, the bins may be grouped together into class intervals of larger cubes or other shapes containing bins. In the case where a class interval is in the shape of a cube, the faces of the cube may be the class interval's boundaries.

Embodiments may extend to the multispectral case by forming a histogram of the multidimensional values that each pixel may take on and partitioning the histogram into evenly spaced class intervals. An initial mean for each class interval may be a centroid of a class interval, a median, average, weighted average, or derived using another convenient statistical measure. A weighted mean WM of a given class interval may be computed as a vector as follows:

$$WM=(\Sigma_i w_i * x_i)/\Sigma_i w_i \quad \text{(Eqn. 3)}$$

wherein i indexes values in a class interval such that $x_i$ may be a vector in the histogram's RGB space pointing to a particular bin or RGB value. Here, $w_i$ may be a weighting function associated with the ith bin, and may be a number of pixels in the bin, although other weighting functions may be used.

In some embodiments the weighting function may have components that vary with the component of the $x_i$ vectors. Also, a separate histogram may be computed for each color. Each separate histogram may then form the basis of its own set of calculations, including initial mean, class interval boundaries, weighted mean computations, shifted means, and/or shifted boundaries.

In the multispectral case, a test for convergence may include computing a weighted vector mean WM for a class interval, subtracting a previous vector mean computed for that class interval, testing to determine if a magnitude of a resulting difference vector is greater than a scalar quantity L, and proceeding as above to shift the mean to a new vector value. The boundaries of the class interval may be updated to WM plus-or-minus vectors along each axis of the space having half a magnitude of a starting width of the class interval.

The foregoing techniques may be scaled to pixels having N-dimensional pixel values. In addition, the foregoing techniques are not limited to image processing, and may be applied to the segmentation of data sets generally. For example, embodiments may be used to analyze data sets relating to sales figures, velocities, distances, stock market valuations, genomic data, economic data, and so forth.

System Overview

Figure 6:
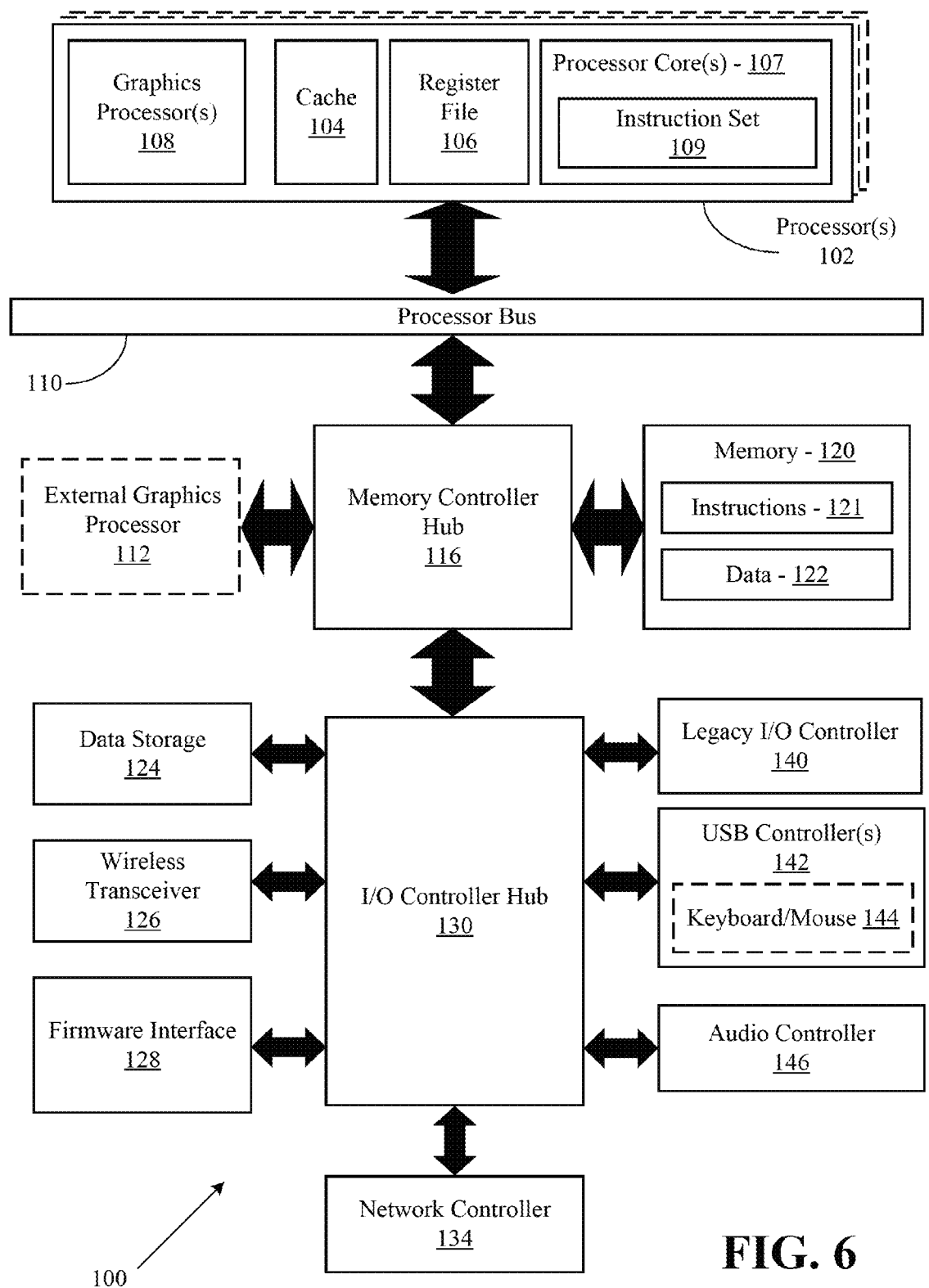
FIGS. 6-8 are block diagrams of an example of an overview of a data processing system according to an embodiment.

FIG. 6 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 7:
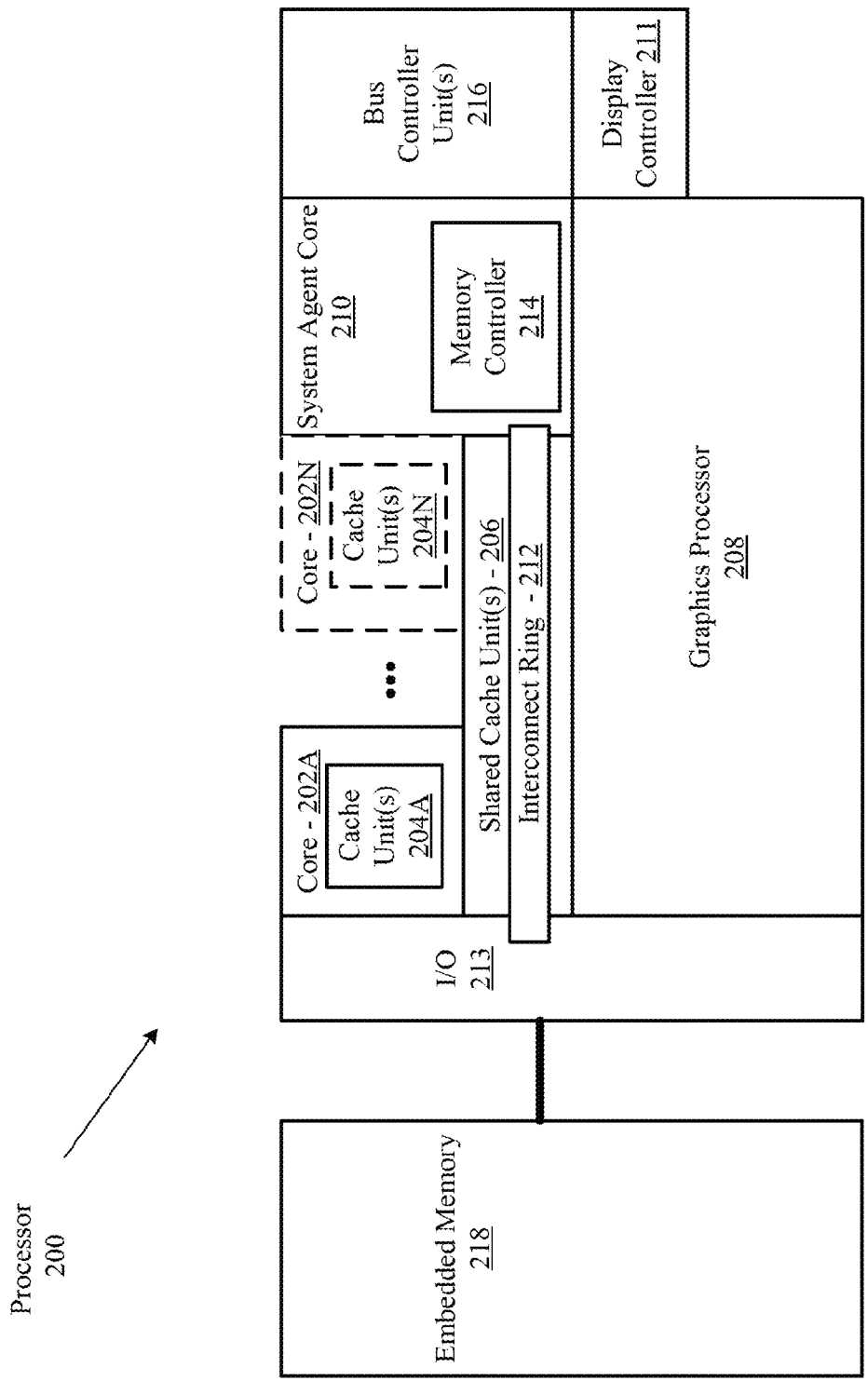

FIG. 7 is a block diagram of an embodiment of a processor 200 having one or more processor cores 202A-202N, an integrated memory controller 214, and an integrated graphics processor 208. Those elements of FIG. 7 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 8:
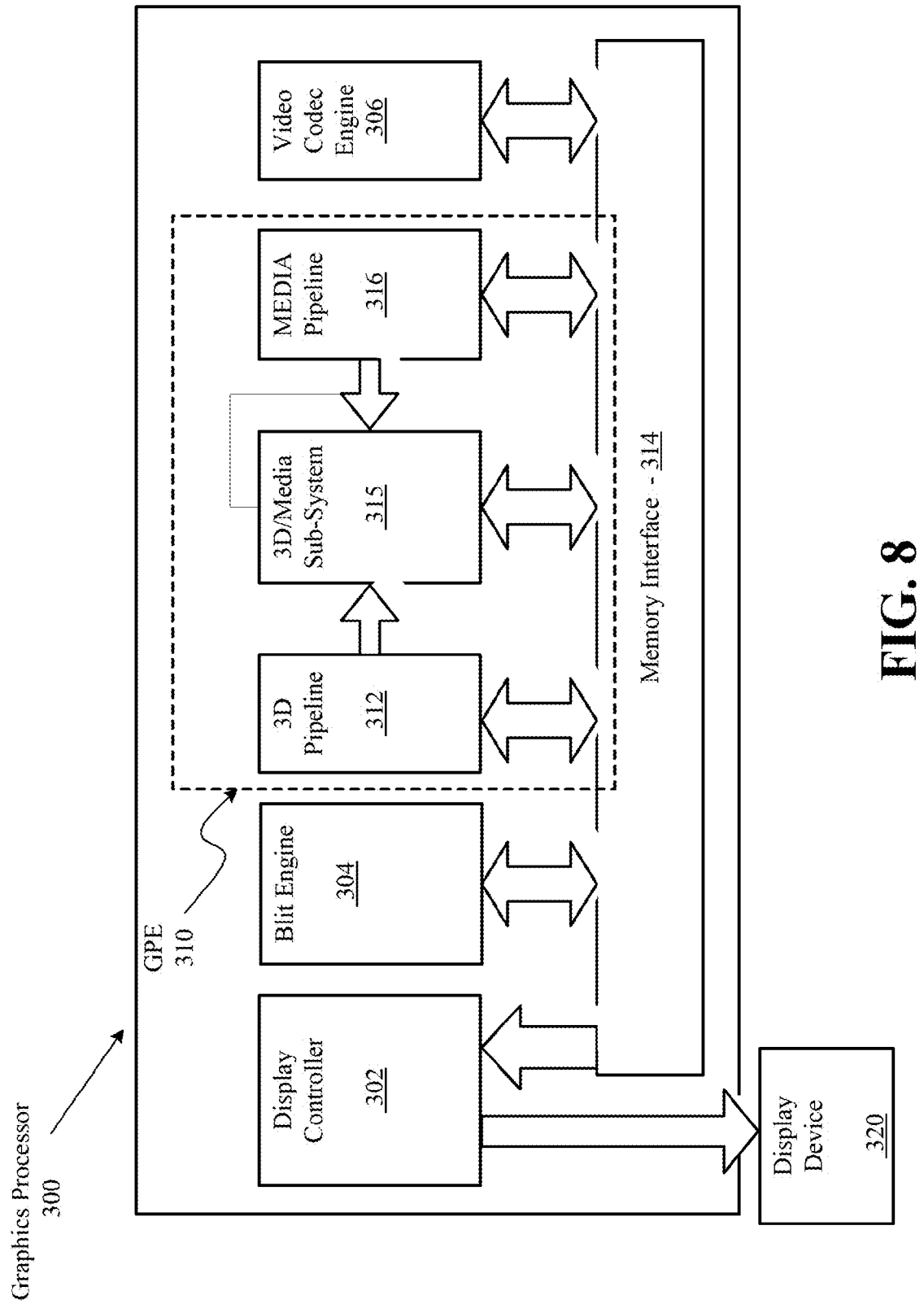

FIG. 8 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 9:
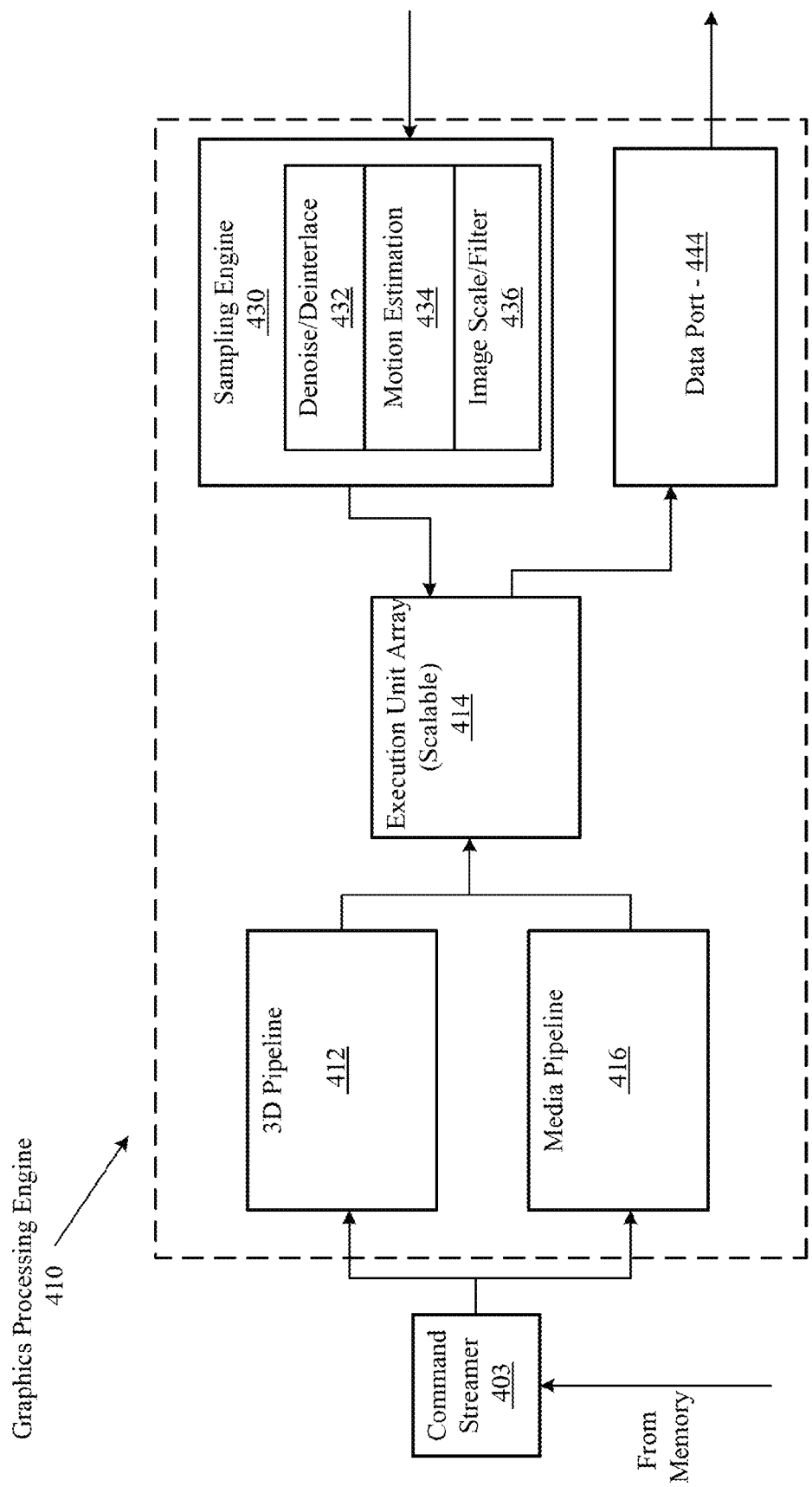
FIG. 9 is a block diagram of an example of a graphics processing engine according to an embodiment.

FIG. 9 is a block diagram of a graphics processing engine 410 of a graphics processor in accordance with some embodiments. In one embodiment, the GPE 410 is a version of the GPE 310 shown in FIG. 8. Elements of FIG. 9 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 10:
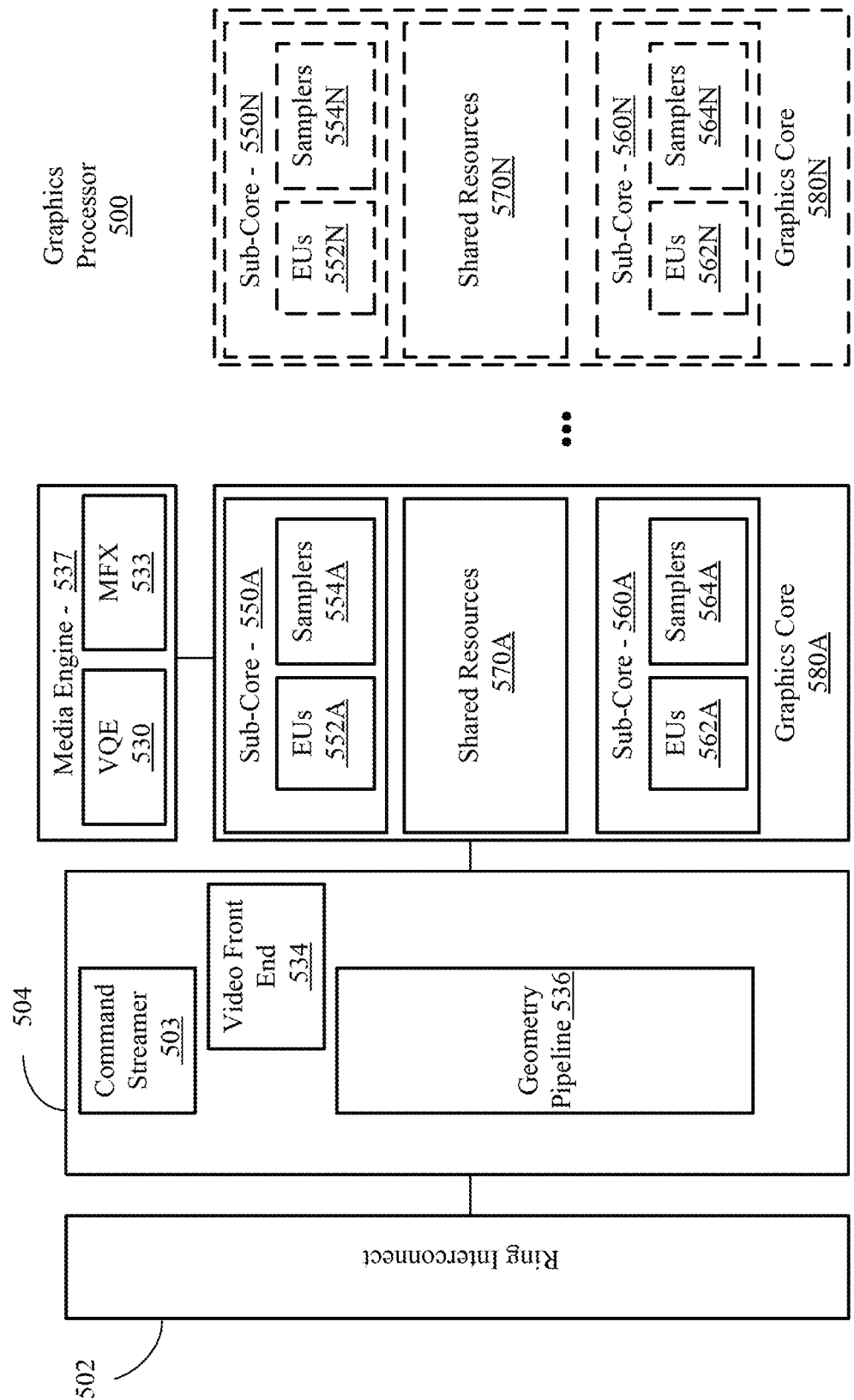
FIGS. 10-12 are block diagrams of examples of execution units according to an embodiment.

FIG. 10 is a block diagram of another embodiment of a graphics processor 500. Elements of FIG. 10 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 11:
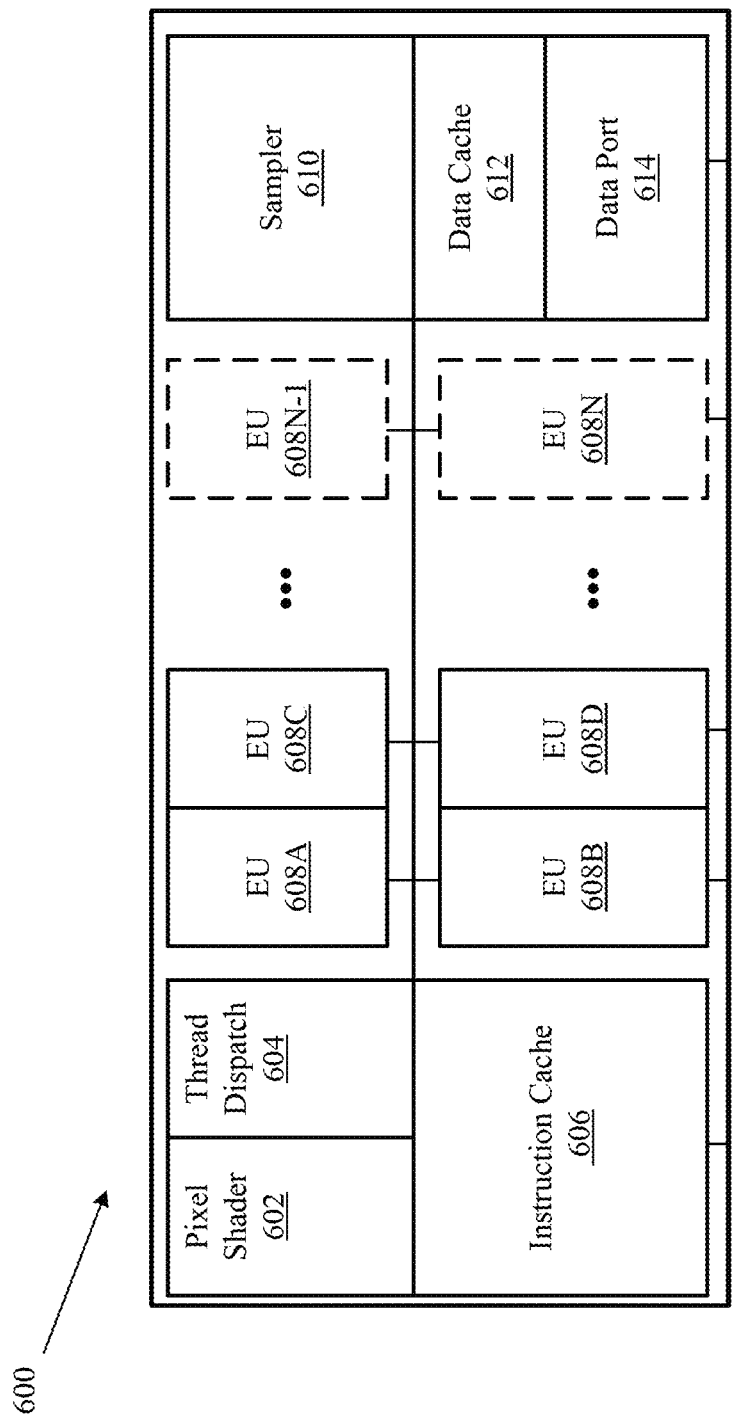

FIG. 11 illustrates thread execution logic 600 including an array of processing elements employed in some embodiments of a GPE. Elements of FIG. 11 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 10)

dispatches vertex processing, tessellation, or geometry processing threads to thread execution logic 600 (FIG. 11). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 12:
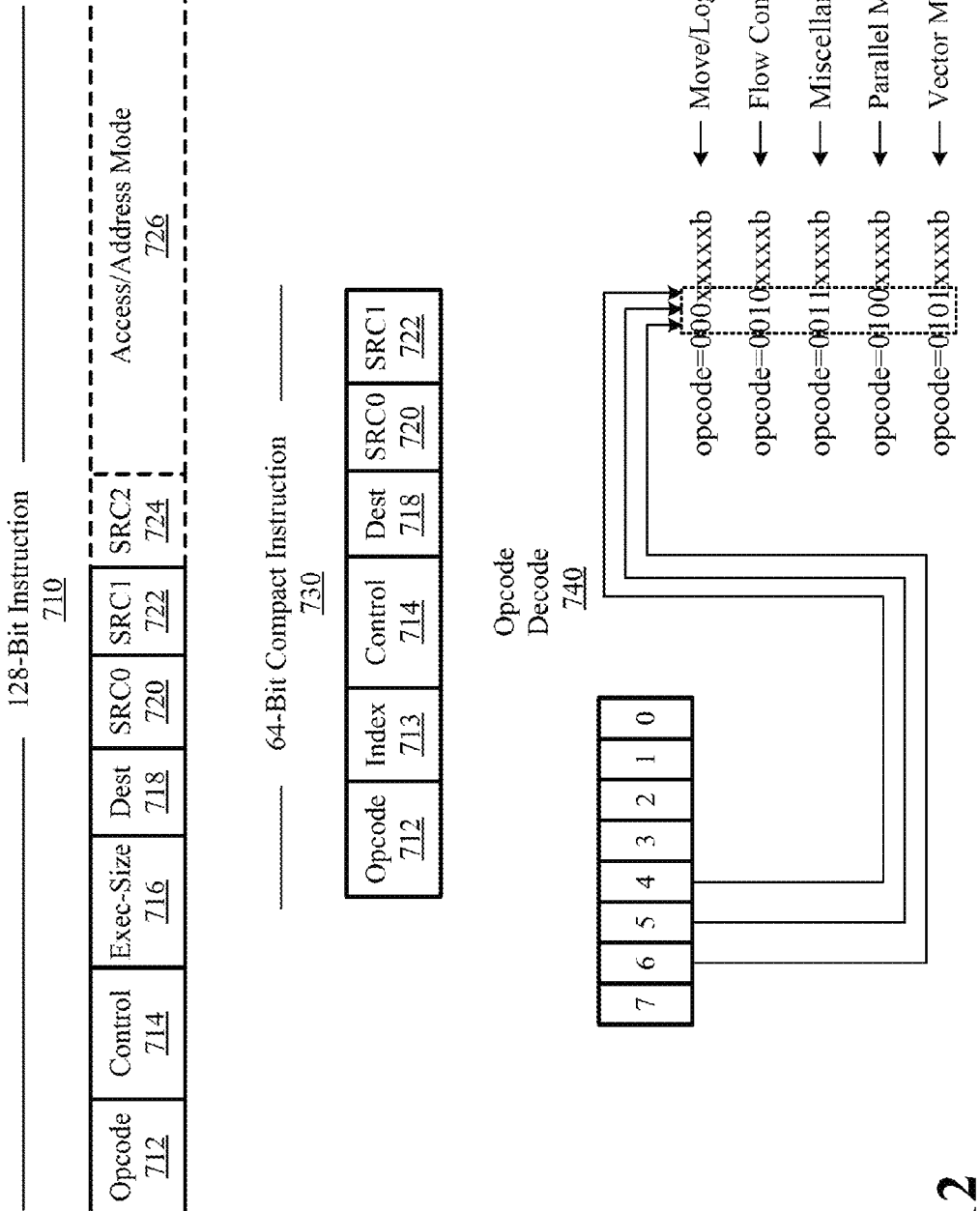

FIG. 12 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 13:
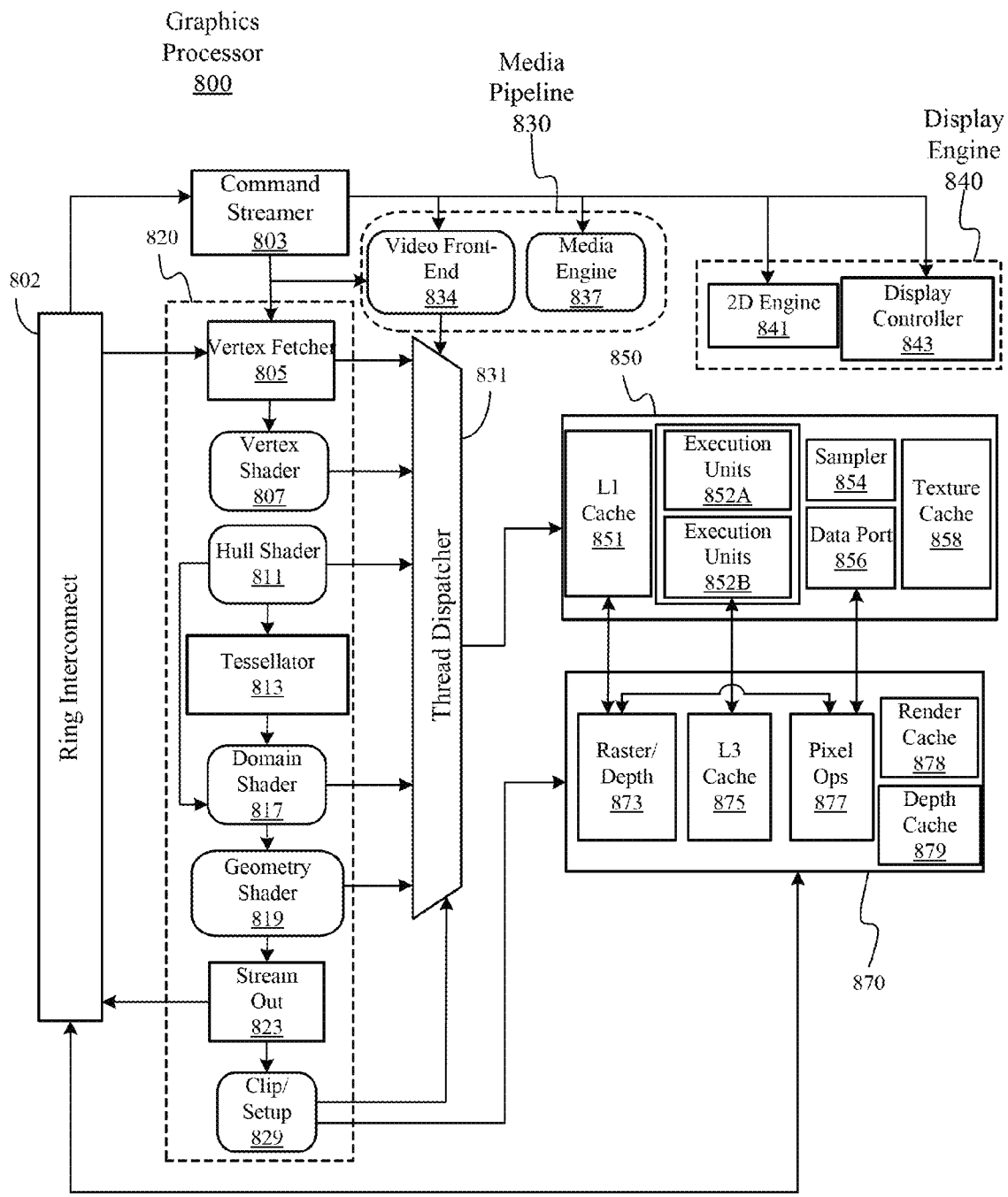
FIG. 13 is a block diagram of an example of a graphics pipeline according to an embodiment.

FIG. 13 is a block diagram of another embodiment of a graphics processor 800. Elements of FIG. 13 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 14A is a block diagram illustrating a graphics processor command format 900 according to some embodiments. FIG. 14B is a block diagram illustrating a graphics processor command sequence 910 according to an embodiment. The solid lined boxes in FIG. 14A illustrate the components that are generally included in a graphics command while the dashed lines include components that are optional or that are only included in a sub-set of the graphics commands. The exemplary graphics processor command format 900 of FIG. 14A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 14B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 15:
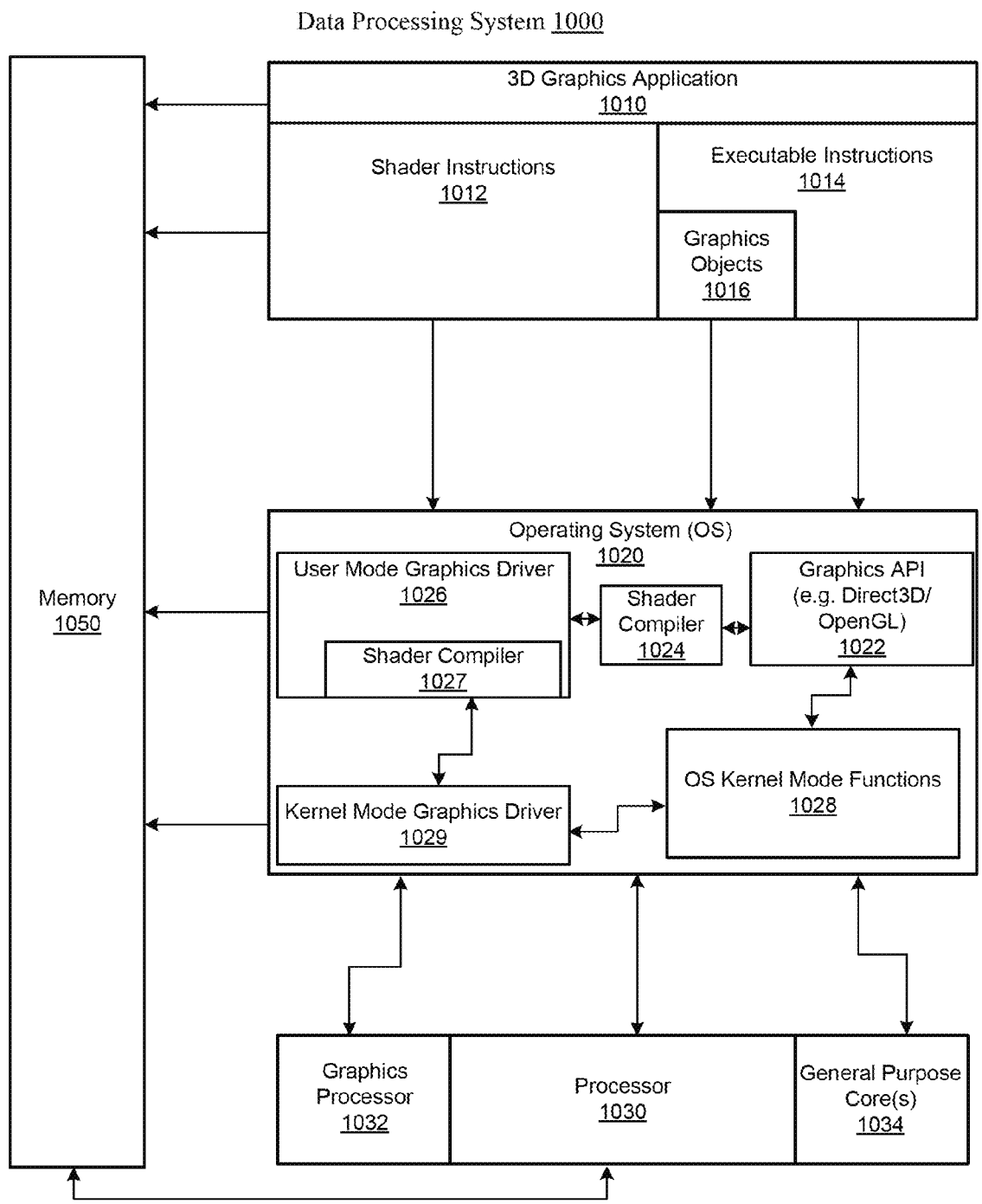
FIG. 15 is a block diagram of an example of a graphics software architecture according to an embodiment.

FIG. 15 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
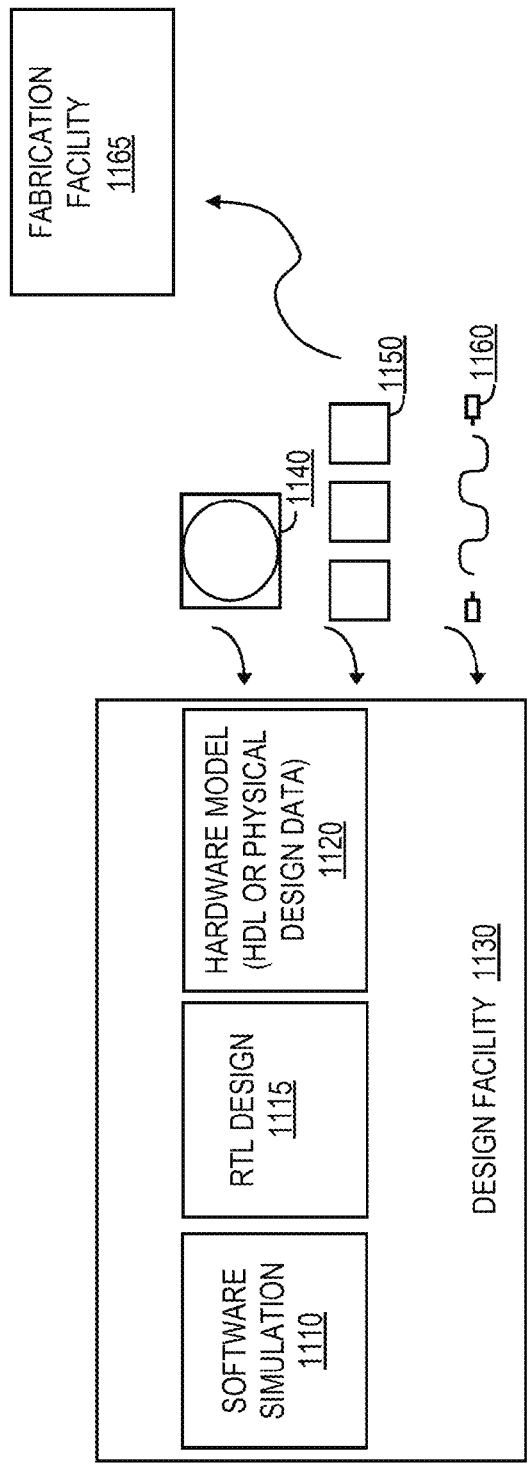
FIG. 16 is a block diagram of an example of an intellectual property (IP) core development system according to an embodiment.

FIG. 16 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 11001112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 17:
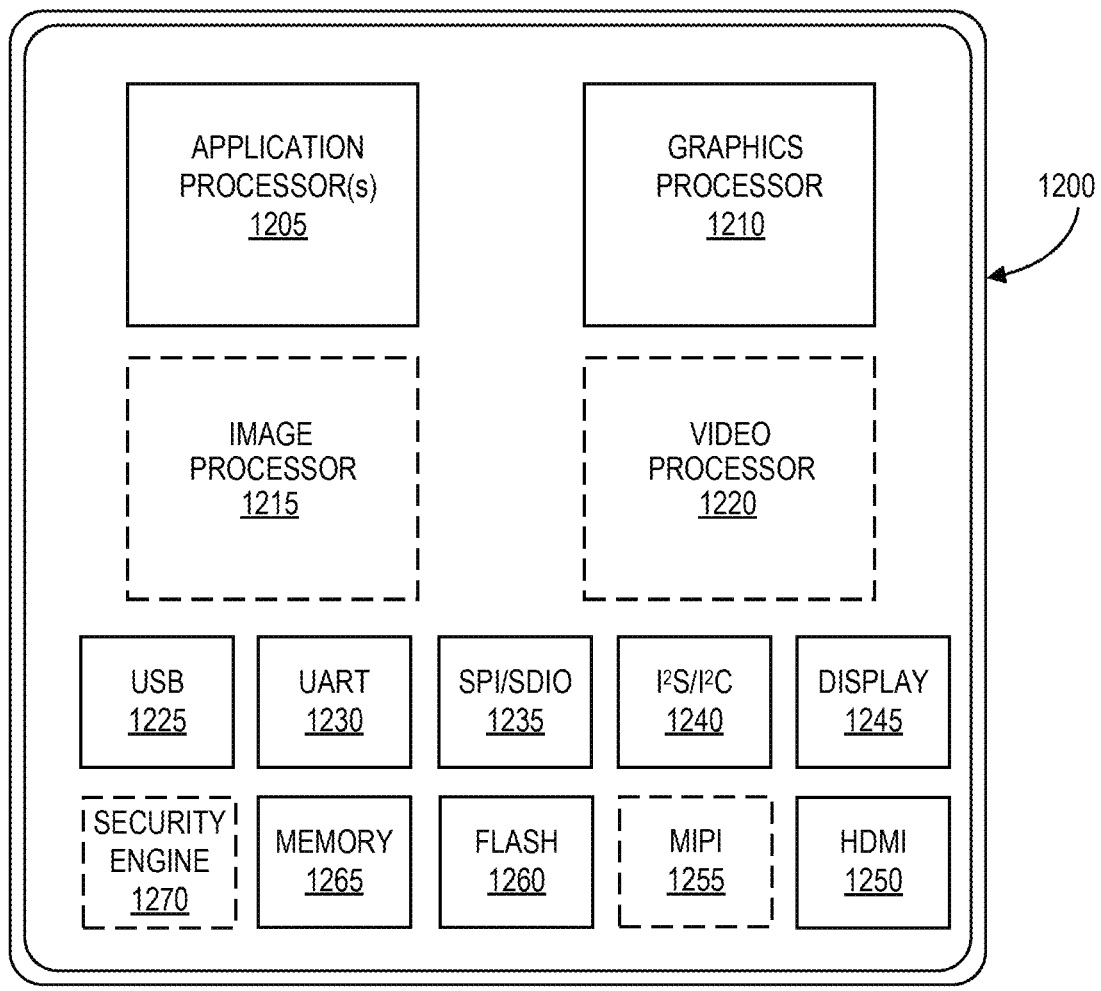
FIG. 17 is a block diagram of an example of a system on a chip integrated circuit according to an embodiment.

FIG. 17 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Additional Notes and Examples

Example 1 may include a system to segment an image using mean shifting, comprising a camera to capture an image that comprises pixels having pixel values, a histogram generator to generate a histogram of the pixel values and to divide the histogram into two or more class intervals, wherein each class interval has boundaries and a width, a mean determiner to compute an initial mean and a weighted mean for each class interval, a class interval mean updater to update a mean of each class interval to a most recently computed weighted mean if a magnitude of a difference between the weighted mean and a previous mean is greater than a limit, a class interval boundary updater to update the boundaries of each class interval based on a respective width and a respective most recently computed mean for each class interval if the magnitude of the difference is greater than the limit, a pixel value updater to update the pixel values of each class interval to a last computed weighted mean for a respective class interval if the magnitude of the difference is not greater than the limit, and a display to display a segmented image based on the updated pixel values.

Example 2 may include the system of Example 1, wherein each pixel value is to correspond to one of a brightness, a color, an intensity, or a distance.

Example 3 may include the system of any one of Examples 1 to 2, wherein the system is to apply the segmented image in one or more of object recognition, surveillance, or tracking.

Example 4 may include the system of any one of Examples 1 to 3, wherein each class interval is to have a same width.

Example 5 may include the system of any one of Examples 1 to 4, wherein the initial mean of a class interval is to be set to a midpoint of the class interval.

Example 6 may include the system of any one of Examples 1 to 5, wherein each class interval is to include at least one bin and the weighted mean for each class interval is to be computed using a weighting function of the number of pixels in the at least one bin.

Example 7 may include the system of any one of Examples 1 to 6, wherein a number of segments in the segmented image is equal to a number of class intervals.

Example 8 may include an apparatus to segment an image using mean shifting, comprising a pixel value determiner to determine a pixel value for pixels in an image, a histogram generator to generate a histogram of the pixel values and to divide the histogram into two or more class intervals, wherein each class interval has boundaries and a width, a mean determiner to compute an initial mean and a weighted mean for each class interval, a class interval mean updater to update a mean of each class interval to a most recently computed weighted mean if a magnitude of a difference between the weighted mean and a previous mean is greater than a limit, a class interval boundary updater to update the boundaries of each class interval based on a respective width and a respective most recently computed mean for each class interval if the magnitude of the difference is greater than the limit, and a pixel value updater to update the pixel values of each class interval to a last computed weighted mean for a respective class interval if the magnitude of the difference is not greater than the limit.

Example 9 may include the apparatus of Example 8, wherein each pixel value is to correspond to one of a brightness, a color, an intensity, or a distance.

Example 10 may include the apparatus of any one of Examples 8 to 9, wherein the apparatus is to apply the segmented image in one or more of object recognition, surveillance, or tracking.

Example 11 may include the apparatus of any one of Examples 8 to 10, wherein each class interval is to have a same width.

Example 12 may include the apparatus of any one of Examples 8 to 11, wherein the initial mean of a class interval is to be set to a midpoint of the class interval.

Example 13 may include the apparatus of any one of Examples 8 to 12, wherein each class interval is to include at least one bin and the weighted mean of each class interval is to be computed using a weighting function of the number of pixels in the at least one bin.

Example 14 may include the apparatus of any one of Examples 8 to 13, wherein a number of segments in the segmented image is to be equal to a number of class intervals.

Example 15 may include a method to segment a data set, comprising generating a histogram of data values, dividing the histogram into a plurality of class intervals, wherein each class interval has an upper boundary, a lower boundary, and a width, computing an initial mean and a weighted mean for each class interval, iteratively re-computing the weighted mean of each class interval and updating the boundaries of each class interval until a difference between the weighted mean and a previous mean is not greater than a limit, wherein the data values of each class interval are updated to a last computed weighted mean for a respective class interval, and constructing a segmented data set from the updated data values.

Example 16 may include the method of Example 15, wherein each data value is associated with a pixel and is to correspond to one of a brightness, a color, an intensity, or a distance.

Example 17 may include the method of any one of Examples 15 to 16, further including applying the segmented data to one or more of object recognition, surveillance, or tracking.

Example 18 may include the method of any one of Examples 15 to 17, wherein each class interval has the same width.

Example 19 may include the method of any one of Examples 15 to 18, wherein the initial mean of a class interval is set to a midpoint of the class interval.

Example 20 may include the method of any one of Examples 15 to 19, wherein each class interval includes at least one bin and the weighted mean of each class interval is computed using a weighting function of the number of pixels in the at least one bin.

Example 21 may include the at least one computer readable storage medium comprising a set of instructions which, when executed by a computing device, cause the computing device to generate a histogram of pixel values, divide the histogram into two or more class intervals each having boundaries and a width, compute an initial mean and a weighted mean for each class interval, update a mean of each class interval to a most recently computed weighted mean if a magnitude of a difference between the weighted mean and a previous mean is greater than a limit, update the boundaries of each class interval based on a respective width and a respective most recently computed mean for the class interval if the magnitude of the difference is greater than the limit, update the pixel values of each class interval to a last computed weighted mean for a respective class interval if the magnitude of the difference is not greater than the limit, and construct a segmented image from the updated pixels.

Example 22 may include the at least one computer readable storage medium of Example 21, wherein each pixel value is to correspond to one of a brightness, a color, an intensity, or a distance.

Example 23 may include at least one computer readable storage medium of any one of Examples 21 to 22, wherein the computing device is to apply the segmented image in one or more of object recognition, surveillance, or tracking.

Example 24 may include at least one computer readable storage medium of any one of Examples 21 to 23, wherein each class interval is to have a same width.

Example 25 may include at least one computer readable storage medium of any one of Examples 21 to 24, wherein the instructions, when executed, cause a computing device to set the initial mean of a class interval to a midpoint of the class interval, and compute the weighted mean using a weighting function based on a number of pixels in a bin in the class interval.

Example 26 may include an apparatus for segmenting an image comprising means for determining a pixel value for each pixel in an image, means for generating a histogram of the pixel values and dividing the histogram into two or more class intervals, wherein each class interval has boundaries and a width, means for computing an initial mean and a weighted mean for each of the class intervals, means for updating a mean of each class interval to a most recently computed weighted mean if the magnitude $|D|$ of a difference between the weighted mean and a previous mean is greater than a limit L, means for updating the boundaries of each class interval based on a respective width and a respective most recently computed mean for a respective class interval if $|D|>L$, and means for updating the pixel values of each class interval to a last computed weighted mean for a respective class interval if $|D| \le L$.

Example 27 may include the apparatus of Example 26, wherein each pixel value is to correspond to one of a brightness, a color, an intensity, or a distance.

Example 28 may include the apparatus of any one of Examples 26 to 27, further including means for applying the segmented image in one or more of object recognition, surveillance, or tracking.

Example 29 may include the apparatus of any one of Examples 26 to 28, wherein each class interval is to have a same width.

Example 30 may include the apparatus of any one of Examples 26 to 29, wherein the initial mean of a class interval is to be set to a midpoint of the class interval.

Example 31 may include the apparatus of any one of Examples 26 to 30, wherein each class interval includes at least one bin and the weighted mean is to be computed using a weighting function of a number of pixels in the at least one bin.

Example 32 may include the apparatus of any one of Examples 26 to 31, wherein the number of segments in the segmented image is to be equal to a number of class intervals.

Example 33 may include a method to segment an image using mean shifting, comprising generating a histogram of pixel values, dividing the histogram into two or more class intervals each having boundaries and a width, computing an initial mean and a weighted mean for each of the class intervals, updating a mean of each class interval to a most recently computed weighted mean if a magnitude of a difference between the weighted mean and a previous mean is greater than a limit, updating the boundaries of each class interval based on a respective width and a respective most recently computed mean for each class interval if the magnitude of the difference is greater than the limit, updating the pixel values of each class interval to a last computed weighted mean for a respective class interval if the magnitude of the difference is not greater than the limit; and constructing a segmented image from the updated pixels, wherein each segment corresponds to a class interval.

Example 34 may include the method of Example 33, wherein each of the class intervals has a midpoint, and the initial mean of each class interval is the midpoint.

Example 35 may include the method of any one of Examples 33 to 34, wherein the boundaries of each class interval are updated to a weighted mean plus-or-minus half the width of the class interval.

Example 36 may include the method of any one of Examples 33 to 35, wherein each class interval is divided into bins.

Example 37 may include the method of any one of Examples 33 to 36, wherein each bin includes one or more pixel values.

Example 38 may include the method of any one of Examples 33 to 37, wherein each bin includes only one pixel value.

Example 39 may include the method of any one of Examples 33 to 38, wherein the weighted mean of each class interval is computed using a weighting function of a number of pixels in the at least one bin.

Example 40 may include the method of any one of Examples 33 to 39, wherein the weighting function is the number of pixels a bin.

Example 41 may include the method of any one of Examples 33 to 40, wherein a number of image segments corresponds to a number of class intervals.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so forth" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system to segment an image using mean shifting, comprising:
    a camera to capture an image that comprises pixels having pixel values;
    a processor to control:
        a histogram generator to generate a histogram of the pixel values and to divide the histogram into two or more class intervals, wherein each class interval has boundaries and a width;
        a mean determiner to compute an initial mean and subsequently to compute a weighted mean for each class interval;
        a class interval mean updater to iteratively update the weighted mean of each class interval to a most recently computed weighted mean if a magnitude of a difference between the weighted mean and a previous mean is greater than a limit, wherein the previous mean is the initial mean when the initial mean has most recently been computed or a previously computed weighted mean when the previously computed weighted mean has most recently been computed;
        a class interval boundary updater to update the boundaries of each class interval based on a respective width and a respective most recently computed weighted mean for each class interval if the magnitude of the difference is greater than the limit; and
        a pixel value updater to update the pixel values of each class interval to a last computed weighted mean for a respective class interval if the magnitude of the difference is not greater than the limit; and
    a display to display a segmented image based on the updated pixel values.

2. The system of claim 1, wherein each pixel value is to correspond to one of a brightness, a color, an intensity, or a distance.

3. The system of claim 1, wherein the system is to apply the segmented image in one or more of object recognition, surveillance, or tracking.

4. The system of claim 1, wherein each class interval is to have a same width.

5. The system of claim 1, wherein the initial mean of a class interval is to be set to a midpoint of the class interval.

6. The system of claim 5, wherein each class interval is to include at least one bin and the weighted mean for each class interval is to be computed using a weighting function of the number of pixels in the at least one bin.

7. The system of claim 1, wherein a number of segments in the segmented image is equal to a number of class intervals.

8. An apparatus to segment an image using mean shifting, comprising:
    a processor to control:
        a pixel value determiner to determine a pixel value for pixels in an image;

a histogram generator to generate a histogram of the pixel values and to divide the histogram into two or more class intervals, wherein each class interval has boundaries and a width;

a mean determiner to compute an initial mean and subsequently to compute a weighted mean for each class interval;

a class interval mean updater to iteratively update the weighted mean of each class interval to a most recently computed weighted mean if a magnitude of a difference between the weighted mean and a previous mean is greater than a limit, wherein the previous mean is the initial mean when the initial mean has most recently been computed or a previously computed weighted mean when the previously computed weighted mean has most recently been computed;

a class interval boundary updater to update the boundaries of each class interval based on a respective width and a respective most recently computed weighted mean for each class interval if the magnitude of the difference is greater than the limit; and a pixel value updater to update the pixel values of each class interval to a last computed weighted mean for a respective class interval if the magnitude of the difference is not greater than the limit.

9. The apparatus of claim 8, wherein each pixel value is to correspond to one of a brightness, a color, an intensity, or a distance.

10. The apparatus of claim 8, wherein the apparatus is to apply the segmented image in one or more of object recognition, surveillance, or tracking.

11. The apparatus of claim 8, wherein each class interval is to have a same width.

12. The apparatus of claim 8, wherein the initial mean of a class interval is to be set to a midpoint of the class interval.

13. The apparatus of claim 12, wherein each class interval is to include at least one bin and the weighted mean of each class interval is to be computed using a weighting function of the number of pixels in the at least one bin.

14. The apparatus of claim 8, wherein a number of segments in the segmented image is to be equal to a number of class intervals.

15. A method to segment a data set, comprising:
generating a histogram of data values;
dividing the histogram into a plurality of class intervals, wherein each class interval has an upper boundary, a lower boundary, and a width;
computing an initial mean and subsequently computing a weighted mean for each class interval;
iteratively re-computing the weighted mean of each class interval and updating the boundaries of each class interval until a difference between the weighted mean and a previous mean is not greater than a limit, wherein the previous mean is the initial mean when the initial mean has most recently been computed or a previously computed weighted mean when the previously computed weighted mean has most recently been computed, and wherein the data values of each class interval are updated to a last computed weighted mean for a respective class interval; and
constructing a segmented data set from the updated data values.

16. The method of claim 15, wherein each data value is associated with a pixel in an image and is to correspond to one of a brightness, a color, an intensity, or a distance.

17. The method of claim 15, further including applying the segmented data set to one or more of object recognition, surveillance, or tracking.

18. The method of claim 15, wherein each class interval has a same width.

19. The method of claim 15, wherein the initial mean of a class interval is set to a midpoint of the class interval.

20. The method of claim 15, wherein each class interval includes at least one bin and the weighted mean of each class interval is computed using a weighting function of a number of pixels in the at least one bin.

21. At least one non-transitory computer readable storage medium comprising a set of instructions which, when executed by a computing device, cause the computing device to:
generate a histogram of pixel values;
divide the histogram into two or more class intervals each having boundaries and a width;
compute an initial mean and subsequently compute a weighted mean for each class interval;
iteratively update the weighted mean of each class interval to a most recently computed weighted mean if a magnitude of a difference between the weighted mean and a previous mean is greater than a limit, wherein the previous mean is the initial mean when the initial mean has most recently been computed or a previously computed weighted mean when the previously computed weighted mean has most recently been computed;
update the boundaries of each class interval based on a respective width and a respective most recently computed mean for the class interval if the magnitude of the difference is greater than the limit;
update the pixel values of each class interval to a last computed weighted mean for a respective class interval if the magnitude of the difference is not greater than the limit; and
construct a segmented image from the updated pixels.

22. The at least one non-transitory computer readable storage medium method of claim 21, wherein each pixel value is to correspond to one of a brightness, a color, an intensity, or a distance.

23. The at least one non-transitory computer readable storage medium method of claim 21, wherein the computing device is to apply the segmented image in one or more of object recognition, surveillance, or tracking.

24. The at least one non-transitory computer readable storage medium method of claim 21, wherein each class interval is to have a same width.

25. The at least one non-transitory computer readable storage medium of claim 21, wherein the instructions, when executed, cause a computing device to:
set the initial mean of a class interval to a midpoint of the class interval; and
compute the weighted mean using a weighting function based on a number of pixels in a bin in the class interval.

* * * * *